United States Patent [19]

Ziegler et al.

[11] Patent Number: 5,123,750
[45] Date of Patent: Jun. 23, 1992

[54] GAS THERMOMETER

[75] Inventors: Horst Ziegler; Horst Behlen, both of Paderborn, Fed. Rep. of Germany

[73] Assignee: Heraeus Sensor GmbH, Hanau, Fed. Rep. of Germany

[21] Appl. No.: 466,331

[22] PCT Filed: Oct. 12, 1989

[86] PCT No.: PCT/EP89/01208
§ 371 Date: May 7, 1990
§ 102(e) Date: May 7, 1990

[87] PCT Pub. No.: WO90/04766
PCT Pub. Date: May 3, 1990

[30] Foreign Application Priority Data

Oct. 25, 1988 [DE] Fed. Rep. of Germany ....... 3836309

[51] Int. Cl.$^5$ ............................................. G01K 11/22
[52] U.S. Cl. ........................................ 374/117; 367/48
[58] Field of Search ............................ 374/117, 118

[56] References Cited

U.S. PATENT DOCUMENTS

| | | |
|---|---|---|
| 3,137,169 | 6/1964 | Clement et al. |
| 3,595,082 | 7/1971 | Miller et al. |
| 4,215,582 | 8/1980 | Akita et al. ........................ 374/119 |
| 4,655,992 | 4/1987 | McKnight et al. ................ 374/117 |
| 4,762,425 | 8/1988 | Shakkottai et al. |
| 4,848,923 | 7/1989 | Ziegler et al. ..................... 374/117 |

FOREIGN PATENT DOCUMENTS 3031678 3/1982 Fed. Rep. of Germany ...... 374/117

Primary Examiner—Daniel M. Yasich
Attorney, Agent, or Firm—Frishauf, Holtz, Goodman & Woodward

[57] ABSTRACT

A gas thermometer has a case with a case end section (10) made of metal of good thermal conductivity and a main case section (14) made of material of poor thermal conductivity. By means of separating walls (46, 48, 62, 64, 70) and reflector walls (66, 68), two sound paths are created in the interior of the thermometer case, which differ by twice the distance between the reflector walls (66, 68). The phase difference of partial sound wave fields which are obtained by splitting a sound wave field produced by a common sound generator (40) between the two paths is converted to an electrical signal corresponding to the temperature in the case end section (10) by using microphones (26, 28) and an analyzing circuit (92) connected with them.

20 Claims, 9 Drawing Sheets

FIG. II

GAS THERMOMETER

The present invention relates generally to a gas thermometer and, more particularly, to a gas thermometer with a hermetically sealed case and a phase measuring circuit.

BACKGROUND

A gas thermometer of this kind is described in German Patent Disclosure Document 30 31 678, HIRT. It serves for the direct measurement of the temperature of hot fluids. To protect the sound generator and the sound receivers against high temperatures the latter are disposed at a comparatively great distance from the actual area of measurement, and to exclude the influence of the sliding temperature transition between the measuring range at high temperature and the sound-generator/sound-receiver range held at lower temperature the two reflector walls are provided, disposed in the measurement area at a distance apart in the direction of propagation of the sound. By measuring the phase shift of the portions of the sound field reflected by these two reflector walls a working signal is then obtained which, under otherwise unchanged measuring conditions, depends only on the temperature of the volume of gas situated between the reflector walls.

In the known measuring system this constitutes a nonreleasable component of the container in which the hot fluid that is to be measured is situated.

THE INVENTION

The present invention provides an improved gas thermometer which is a portable, independent apparatus which can be moved from one point of use to another point of use like a normal thermometer.

In the gas thermometer according to the invention there is a hermetic case in which the reflector walls form part of the case walls. A working gas, which can be especially selected with a view to the particular use of the gas thermometer, is enclosed in the case interior.

The hermeticity of the case does not simply permit the use of a working gas especially suited to temperature measurement in a particular temperature range; since a good acoustical isolation from external noise is also provided, the temperature measurement can be performed with low sound amplitudes, and this is again an advantage as regards low radiation of the sound of the gas thermometer to the exterior.

According to a further feature of the invention it is brought about that, even at high temperatures, the working gas does not enter into any chemical reactions with the material from which the case is made. If krypton or xenon is used as the working gas, there is additionally a poor thermal conduction in the gas column situated between the measuring end and the generator/receiver end of the gas thermometer. Furthermore, in noble gases the velocity of sound is largely independent of pressure, so that the gas thermometer has a great temperature range with high accuracy, without the need for correction of the measurement due to the pressure-dependence of the velocity of sound, or for taking precautions at the apparatus to keep the pressure of the working gas constant.

According to further features of the invention, it is brought about that, even at extremely high temperature differences, the pressure inside the case of the gas thermometer remains substantially constant, so that even at these very great temperature differences no corrections of the results of the measurement are necessary.

According to further features of the invention, undesirable consequences of sound reflections at the ends of the sound channels which are adjacent to the sound generator or a sound receiver are mitigated. Secondary waves reflected at these channel ends would otherwise possibly superimpose themselves on the main wave used for the measurement and falsify its phasing. In a gas thermometer featuring sound absorbers, however, the ends of the measuring channels are terminated by an acoustical sink. The sound receivers in the system serve as pure detectors of pressure variations.

An embodiment with 2 folded sound channels is advantageous for its particularly good isolation of the two sound channel sections returning from the reflector walls. The small inside dimension of the sound channels in comparison with the sound wavelength brings it about that the sound propagation takes place unimodally in the sound channels.

With the further development of the invention in which the tube sections all have equal diameters, it is brought about that the same sound dispersion and sound damping is had for all sound channel sections.

The further development of the invention in which the measuring-point ends of the tube are joined together by curved tube sections, is advantageous for the ease of manufacture of the gas thermometer: the reflector walls are obtained simply by bending tubular material.

In the case of a gas thermometer in which one of the curved tube sections is a coiled tube, a great difference in path length is obtained in the two sound channels with a shorter total length.

With the further development of the invention in which 2 mutually orthogonal walls are set at 45° to the sound generator axis, it is achieved that the forward and return path of the sound waves are spatially separate from one another. This spatial separation is advantageous with regard to the avoidance of acoustical short-circuits and with regard to clean phasing conditions.

Also the further development of the invention featuring divider walls aligned with a reflector apex, serves for isolation between emitted sound wave and returning sound waves.

With the further development of the invention featuring a secondary wall behind the reflector wall, it is brought about that the thermal conditions for the comparative sound wave field which returns from the reflector wall disposed at the shorter distance from the sound generator are precisely the same as for the other sound field which is thrown back from the reflector wall that is disposed at a longer distance from the sound generator.

The further development of the invention featuring openings adjacent the secondary wall which have a diameter small in comparison to the sound wavelength serves for a still further equalization of the thermal conditions for the two sound paths, the thermal conduction through the gas columns themselves now being the same.

With the further development of the invention in which the sound path behind the reflector wall is folded meander-wise, an increase in the difference between the paths is obtained with compact overall dimensions of the gas thermometer, resulting also in a corresponding increase of the phase shift between the two sound wave fields returned by the two reflector walls. An improved accuracy of measurement is thus obtained.

With the further development of the invention in which the apex of each reflector plate is joined to a plate of good thermal conductivity, an improved thermal coupling of the measuring end of the gas thermometer to the surface of a body whose temperature is to be measured is obtained. Without the contact plate described in claim 20 there would be only point contacts or linear contacts between the measuring end of the gas thermometer and the surface of the body to be measured.

With the further development of the invention in which the section of the case between the reflector walls is of good thermal conductivity it is brought about that in the area between the two reflector walls the temperature to be measured prevails throughout, temperature gradients which falsify the result of the measurement do not occur in the actual measuring course.

In a gas thermometer featuring means for varying the effective length of the sound path one has for the reference measuring channel precisely the same conditions as in the corresponding section of the measuring channel itself, since the reference sound channel is obtained by separating a portion of the measuring sound channel.

The further development of the invention, featuring a movable control body, permits a simple and uniform changeover between reference sound channel and measuring sound channel.

At the same time it is possible, featuring a control body position indicator, automatically to perform even synchronously a switching of the output signals obtained from the sound receiver to different measuring signal memories.

The further development of the invention in which the case head part is made from material of good thermal conductivity is again advantageous in regard to constant temperature in the actual measuring section of the measuring sound channel.

a gas thermometer, in which the length changing means is equipped with a head part and stops, has a mechanically quite simple construction. The distance additionally covered by the sound in the medium to be measured in the measuring sound channel, in comparison to the reference sound channel, is given repeatably by means of stops, and in an easily adjustable manner.

The further development of the invention featuring a position signaling means again makes possible a simple and automatic switching of the sound receiver output signals to two different measuring signal memories.

With the further development of the invention featuring signal length discriminators connected to an output of the position signaling means it is brought about that a measuring signal is taken for evaluation only if the sound conducting system has been held for a given minimum time in the one or the other working position.

In a gas thermometer which is intended for contact temperature measurement it is possible with the further development featuring a contact sensor on the front end face of the head part to assure that a measuring signal will be taken for evaluation only if the gas thermometer has stood sufficiently long in contact with the measuring surface.

At the same time, in an embodiment in which the output signals of the contact sensor and the position indicator means are combined, a reference signal value is prevented from being accepted unless the gas thermometer was in contact with the body to be measured.

The further development of the invention in which the sound conductor system is biased by a spring permits an especially simple phasic adjustment of the two working positions of the sound conductor system. Upon exertion of low contact pressure, the reference signal receiving position is maintained, if the force of the spring biasing the case unit is overcome, the working position is obtained in which the sound is guided through the portion of the path that is under the measuring temperature.

The further development of the invention featuring insulation surrounding the head part except at the end section is again advantageous as regards very constant temperature conditions within the actual measuring path.

DRAWINGS

The invention will be further explained below with the aid of embodiments, with reference to the drawing, wherein.

DETAILED DESCRIPTION

Figure 1:
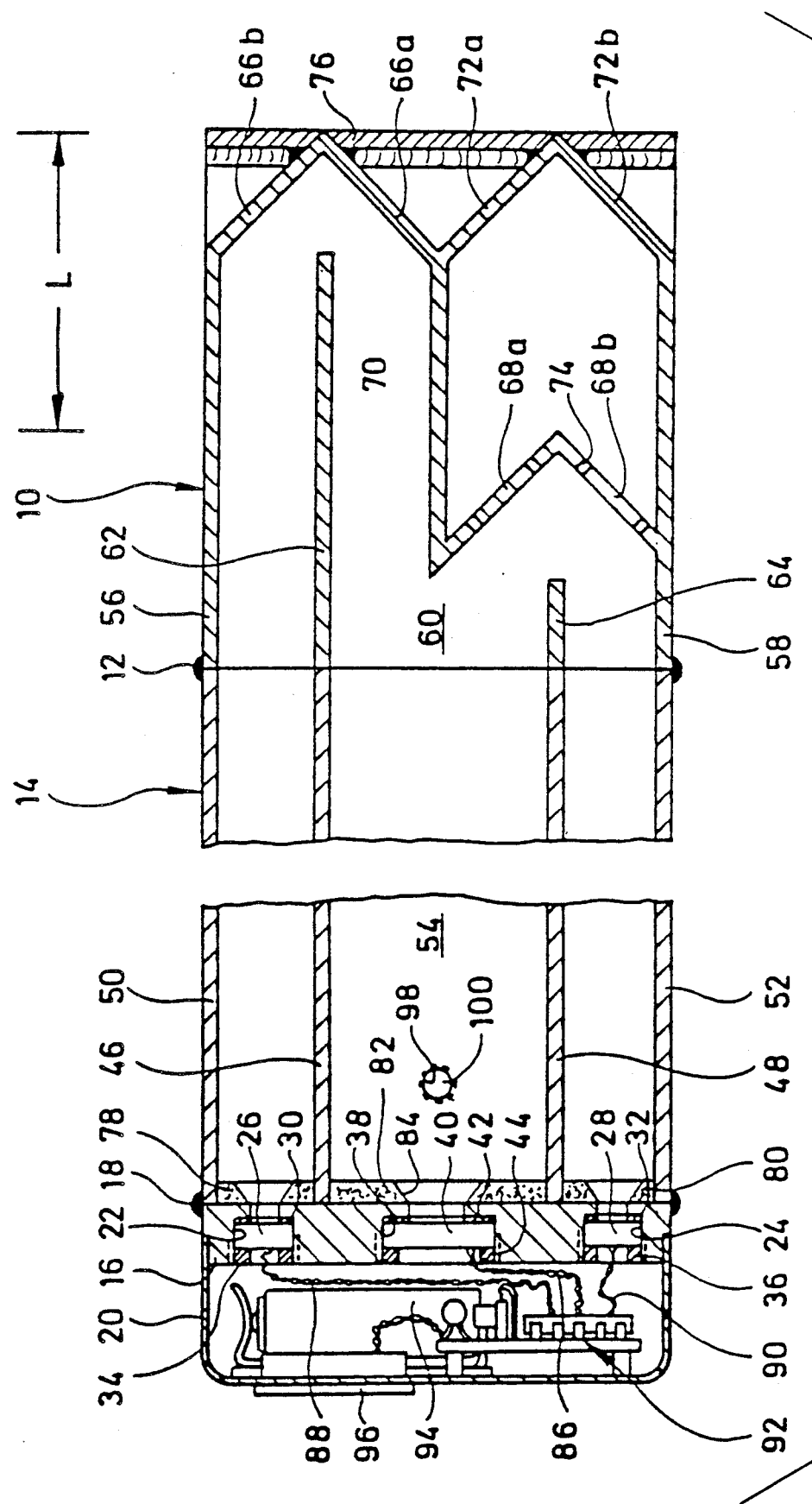
FIG. 1 is a longitudinal section through a first precision gas thermometer having a wide range of measurement.

The gas thermometer shown in FIG. 1 has a multipartite case with a case end section identified as a whole by 10, which is made from a material of good thermal conduction such as copper or silver. The case end section 10 is fixedly mounted by a weld or a solder junction 12 to the end of a main case section 14 which is made of material of poor thermal conduction such as high-grade steel. The left end of the main case section 14 is closed by an end plate 16 with another weld or brazing 18. The end plate 16 in turn bears a cap 20 of sheet metal.

The case formed by the above-named parts is generally rod-shaped, the largest portion of the case main section 14 is broken away.

The end plate 16 has lateral stepped bores 22, 24, into which first and second sound receivers or microphones 26, 28, are tightly and sealingly inserted with the interposition of gaskets 30, 32, by means of threaded rings 34, 36.

Into an additional, central stepped bore 38 in the end plate 16 there is inserted a sound generator 40, e.g., an electrostrictive vibrator, piezo-acoustic converter or loudspeaker. Its end face on the right int he drawing is sealed from the interior of the case by a gasket 42. The sound generator 40 is urged against the gasket 42 by, again, a threaded ring 44.

Between the microphone 26 and the sound generator 40 there is provided a dividing wall 46 running in the direction of the length of the case, and between the microphone 28 and the sound generator 40 a dividing wall 48 is provided.

Outer defining walls of the main section 14 of the case are identified as 50, 52 and 54. These case walls merge flush with aligned case walls 56, 58 and 60 of the case end section 10 made material of good thermal conduction.

Similarly, the dividing wall 46 continues in a dividing wall 62 and dividing wall 48 in a dividing wall 64 of the case end section 10.

The dividing wall 62 terminates at a distance from and in front of two reflector wall parts 66a, 66b, which are set at +45° and −45°, respectively, to the plane of the dividing wall 62 and to the longitudinal axis of the sound channels, and together form an acoustical 180° reversing mirror.

Dividing wall 64 terminates similarly at a distance from and in front of two dividing wall sections 68a, 68b, which again are set at +45° and −45° to the plane of the dividing wall 64 and also form together an acoustical 180° reversing mirror. As it can be seen in the drawing, the parts 66 of the reflector wall are at a greater distance from the end plate 16 than reflector wall parts 68. The difference in distance is marked L in FIG. 1.

The interior ends of the reflector wall parts 66a and 68a are joined by an additional dividing wall 70 running lengthwise of the case.

Behind the reflector wall parts 68a, 68b, secondary wall parts 72a, 72b are disposed which correspond in their geometry to reflector wall parts 66a and 66b. The space between reflector wall parts 68a, 68b and the secondary wall parts 72a, 72b is rheologically connected with the rest of the interior of the case by openings 74 in reflector wall parts 68a, 68b, these openings being small compared with the sound wavelength.

The secondary wall parts 72a and 72b are, on the one hand, advantageous with regard to a stable placement of the gas thermometer on the surface of an object to be measured, and on the other hand the conditions of thermal transfer from the test object to be measured to the portion of the case lying below the case's central plane and to the portion of the case lying above this central plane are thus equal, both as regards thermal conduction through metal structures and as regards thermal conduction through gas columns.

To improve thermal contact between the end of the gas thermometer and the surface of the test body to be measured, a contact plate 76, which is likewise made of material of good thermal conduction such as copper or silver, is fixedly placed, welded for example, on the apexes which are formed by the reflector wall parts 66a, 66b and the secondary wall parts 72a, 72b.

On the inside of the end plate 16 insulators 78, 80, 82 are placed, which are made of sound-absorbing material, e.g., of porous plastic material. The insulators 78 to 82 are each provided with a funnel-shaped opening 84 to permit sound to be emitted or received by the sound generator or receiver situated behind them.

The sound generator 40 and the microphones 26, 28, responding to the sound returning from the case's end section are connected by cables 86 and 88, 90, to a working analyzing circuit generally designated by 92, which is supplied from a battery 94, generates a working signal representative of the measured temperature, and displays the measured temperature on an LCD display 96.

The entire interior of the thermometer case is filled with a working gas which is selected according to the anticipated temperature measurement range. For only moderately low temperatures all the way to very high temperatures of several hundreds or thousands of degrees Celsius, krypton or xenon is used as the working gas. This working gas can be charged through a threaded bore 98 in the back case wall 54 of the main case section 14, which is closed with a threaded plug 100 after the filling procedure. For measurements at very low temperatures helium is used as the working gas. The pressure of the working gas is adjusted such that in the middle of the anticipated temperature range an approximately atmospheric pressure will prevail in the interior of the case. Since the thermometer case, as seen in the drawing and described above, is well reinforced by dividing walls interposed between the outer case walls a relatively great pressure or a relatively great sub atmospheric pressure can be applied to the case.

The gas thermometer described above operates roughly as follows:

The sound generator 40 produces, in the channel defined by the dividing walls 62, 64 and running lengthwise of the case, a substantially even sound wave field from which one half is split off by the reflector wall part 68a. This part of the sound wave field, after reflection at the reflector wall part 68a followed by reflection at the reflector wall part 68b, reaches the channel leading to the microphone 28, this channel being defined by the dividing walls 48 and 64 and the case walls 52 and 58.

That part of the, sound wave field which runs past the reflector wall part 68 passes through a channel which is defined by the dividing wall 62 and dividing wall 70. This part of the sound wave field is reflected by the reflector wall parts 66a and 66b and then passes through a channel defined by the case walls 50, 56, and the dividing walls 46, 62, to the microphone 26. The geometric path difference between the part of the sound wave field which is carried to the microphone 26 and the part of the sound wave field that is carried to the microphone 28 amounts to 2 L. The path 2 L passes through a working gas which is at the temperature that is to be measured. Since the case end section 10 is made of metal of good thermal conductivity the assurance is provided that there are no temperature differences on the path 2 L. The phase difference between the portions of the sound field produced by the sound generator 40 and reaching the microphones 26 and 28 depends (aside from an invariable basic amount caused by the geometry) definitely on the temperature of the working gas in the case end section 10, i.e., on the liquid or gas temperature at which the case end section 10 is held, or on the temperature of a test body against which the contact plate 76 is pressed. The conversion of this phase difference to a temperature reading is provided for by the working/analyzing circuit 92, which will be explained in greater detail in connection with FIG. 3. In the case of the modified gas thermometer which is shown in FIG. 2, parts which are functionally the same as those parts already explained above with reference to FIG. 1 are again provided with the same reference numbers.

Figure 2:
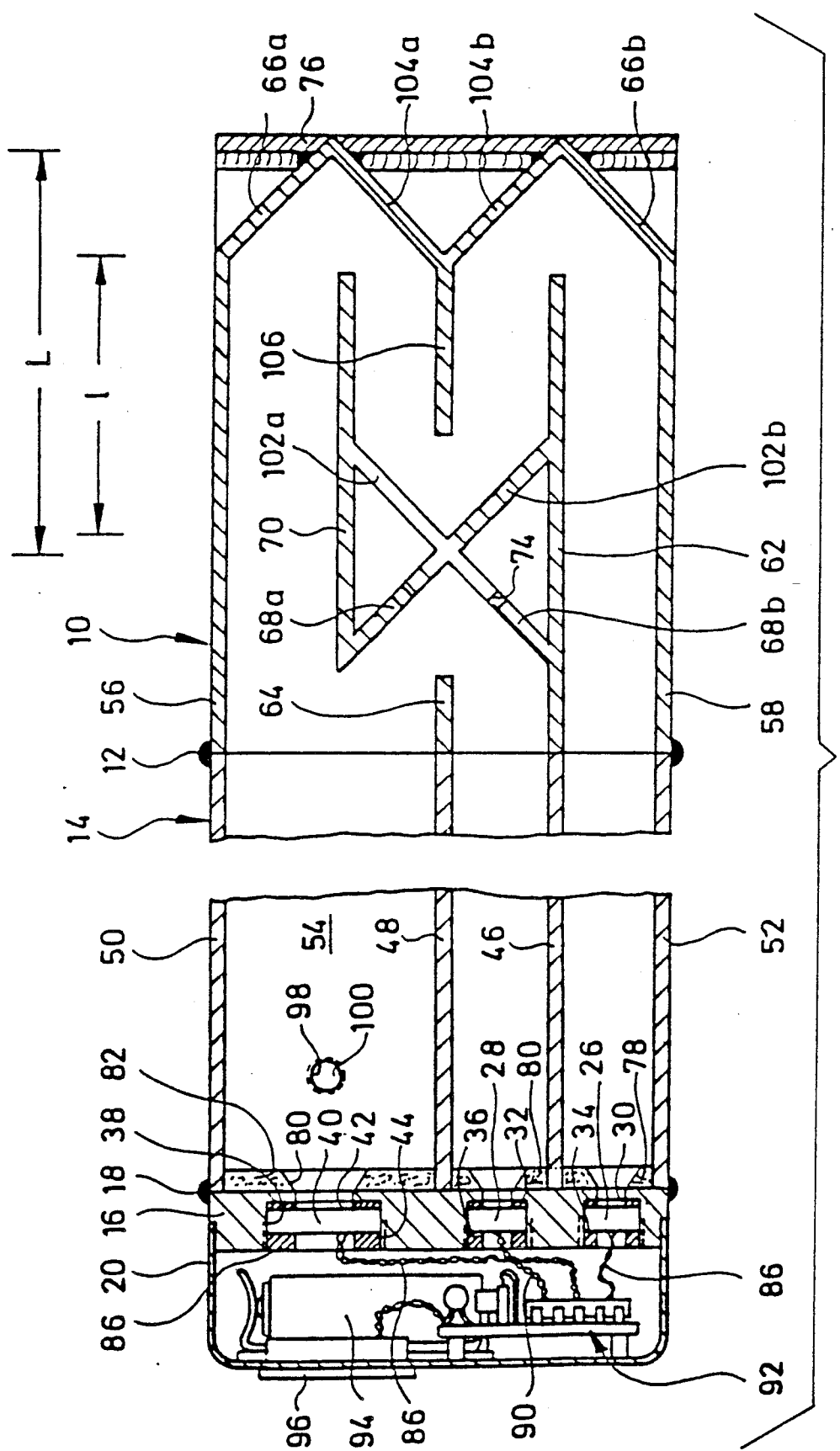
FIG. 2 is a section similar to that of FIG. 1, in which a variant precision gas thermometer with a large range of measurement is shown.

In the gas thermometer of FIG. 2, the reflector wall parts 68a, 68b, are prolonged by in-line secondary reflector wall parts 102a, 102b. Between the reflector wall parts 66a and 66b additional secondary reflector wall parts 104a, 104b, are inserted, and an additional separating wall 106 runs from their apex to the left in FIG. 2, and terminates in front of the secondary reflector wall parts 102a, 102b.

In FIG. 2 the distance between the secondary reflector wall parts 102 and 104 is marked 1. It can be seen that, if the outside dimensions of the thermometer case are unchanged, the path difference between the two sound wave parts amounts to $2*(1+L)$. The phase difference between the parts of the sound wave field reaching the microphones 26 and 28 is accordingly greater, as is also the accuracy of measurement.

The working/analysing circuit 92 will now be described with reference to FIG. 3.

A piezo-electric crystal resonator 108 is connected to a frequency 11 divider 110 which is connected to an audio-frequency output (50 Hz to 10 kHz) with a power amplifier 112 which operates on the sound generator 40. Additional outputs of the frequency divider 110 prepare modulation signals $F_{m1}$ and $F_{m2}$, respectively, which feed mixing circuits 114 and 116, respectively, which belong to the signal forming circuits generally indicated at 118 and 120, connected to the microphones 26 and 28, respectively.

The mixing circuit 114 receives, through a preamplifier 122 and a broad-band input filter 124, the output of whichever microphone is associated with the signal-forming circuit in question. The output signal of the mixing circuit 114 is sent through a narrow-band main filter 126 to the second mixing circuit 116 which is followed by a low-pass filter 128.

A clock crystal is used preferentially as the main filter 126; it can be obtained at low cost with a high constancy and a frequency related to temperature. Such a crystal operates typically at a frequency of 32768 Hz. The modulation frequency $f_{m1}$ is selected such that, by mixing with sound generator 40's working frequency recovered in the output signal of the microphones 26, 28 (frequency in the audio-frequency range), a signal is obtained whose frequency coincides with the frequency $F_{zf}$ of the main filter 126. The modulation frequency $F_{m2}$ is selected such that, by mixing with the frequency $f_{zf}$ running through the main filter 126, a low-frequency signal with a frequency $F_{nf}$ is obtained which is in the range between 1 and 50 Hz and is produced at the output of the low-pass filter 128. The phasing of the high-frequency output signal of the microphone 26 or 28 is fully preserved in this low-frequency signal at the output of the low-pass filter 128. Since the output signals of the signal forming circuits 118 and 120 are of very low frequency, relatively slow-working and therefore inexpensive circuits can be used for comparing the phasing. Starting out from effective sensor lengths (2 L and $2*(1+L)$ respectively) amounting to 0.5 to 10 cm, transit time differences were obtained of 20 nsec to 2 usec per Kelvin and per °C., respectively. This calls for extremely rapid phase comparison circuits, which are expensive. Also, in the direct phase comparison of the microphone output signals the suppression of acoustical disturbances caused by body sound would require special measures and complex analog filters. Such filters, however, then entail appreciable transit times and lead to phase errors which are caused by scatter in the characteristics of the components used and to aging and the temperature dependency of the components used, and are also poorly repeatable. If one sets out from a sound frequency of 1 kHz and selects a frequency of, for example, 2 Hz at the output of the low pass filter 128, it is necessary to check the comparison of the phasing only at a vibration that is 500 times slower, and if noble gases are used for filling the thermometer case, time differences are obtained which are in the range of definitely more 1 $\mu$sec per Kelvin, which is still desirable for the avoidance of an excessively costly detection of the phase difference.

Figure 3:
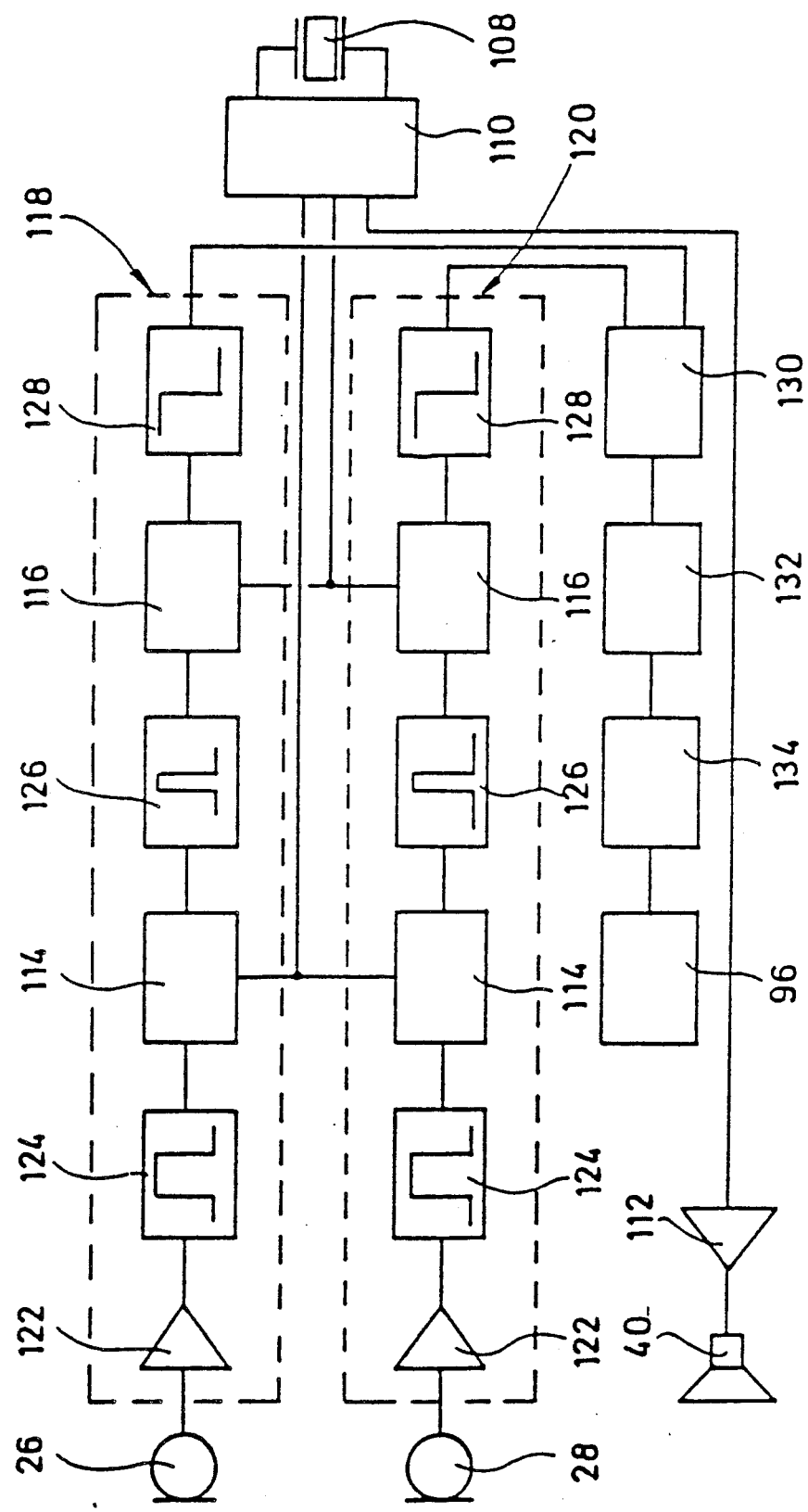
FIG. 3 is a block circuit diagram of a working and analyzing circuit which is used in the gas thermometers of FIGS. 1 and 2.

The phase difference meter determining the above-described phase difference between the sound wave fields entering at the microphones 26 and 28 is shown only schematically at 130 in FIG. 3. Such phase difference measuring circuits are known per se and do not need to be further described here. The output signal of the phase difference measuring circuit 130 goes to an analog-to-digital converter 132 by which a mathematical-constant memory 134 is addressed. In the latter are stored the temperatures pertaining to a given phase difference. The temperatures read from the constant memory 134 are displayed by the LCD display 96.

As explained above, temperature variations in the end section 10 of the gas thermometer case when the gas volume is tightly sealed lead to pressure changes within the thermometer case. If the working gas inside of the thermometer case is at normal pressure at room temperature, the case can easily withstand the gas pressure prevailing in the case interior at temperatures up to 600° K., on account of its mechanically sturdy, multi-ribbed construction. Neither does the outside pressure increasing upon chilling below room temperature create any problems for the thermometer case. If it is desired to use a gas thermometer as described above, but for very high temperatures, additional devices can be provided on this gas thermometer to keep the pressure in the case constant, such as those shown in FIGS. 4 and 5.

Figure 4:
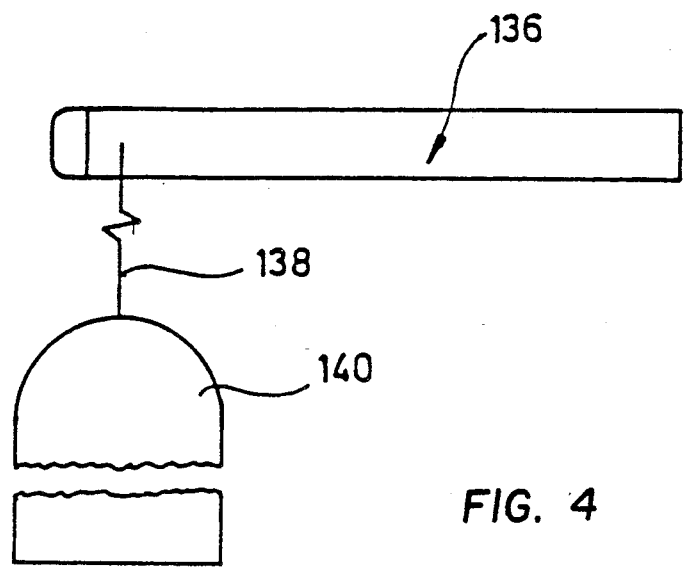
FIGS. 4 and 5 show gas thermometers according to FIGS. 1 or 2 with additional devices which permit use within a very great temperature range.

In FIG. 4, on the gas thermometer identified as a whole by 136, a flexible conduit 138 is connected to the threaded bore 98 instead of the threaded plug 100, and leads to a rigid equalization tank 140 which has a large volume in comparison to the volume of the end section 10 of the case. Thus, the pressure in the interior of the thermometer case is kept substantially constant by the large equalization tank 140.

Figure 5:
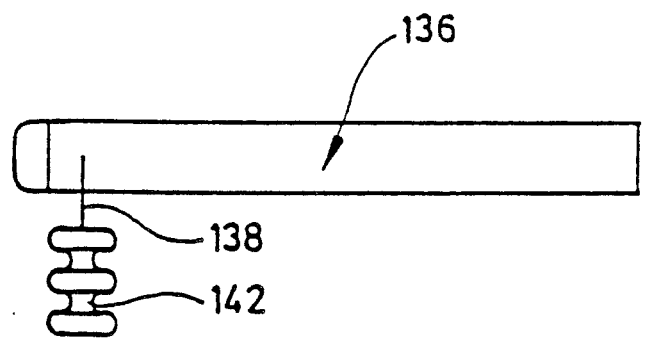

In the embodiment shown in FIG. 5, a metal bellows 142 is connected to the line 138, thus also achieving a reduction of the pressure rise in the interior of the thermometer case at high temperatures.

In the additional gas thermometer shown in FIG. 6, thermometer parts which correspond functionally to the parts already explained with reference to FIGS. 1 to 5 are again provided with the same reference numbers. These parts will be referred to separately below only to the extent that they have characteristic differences.

Figure 6:
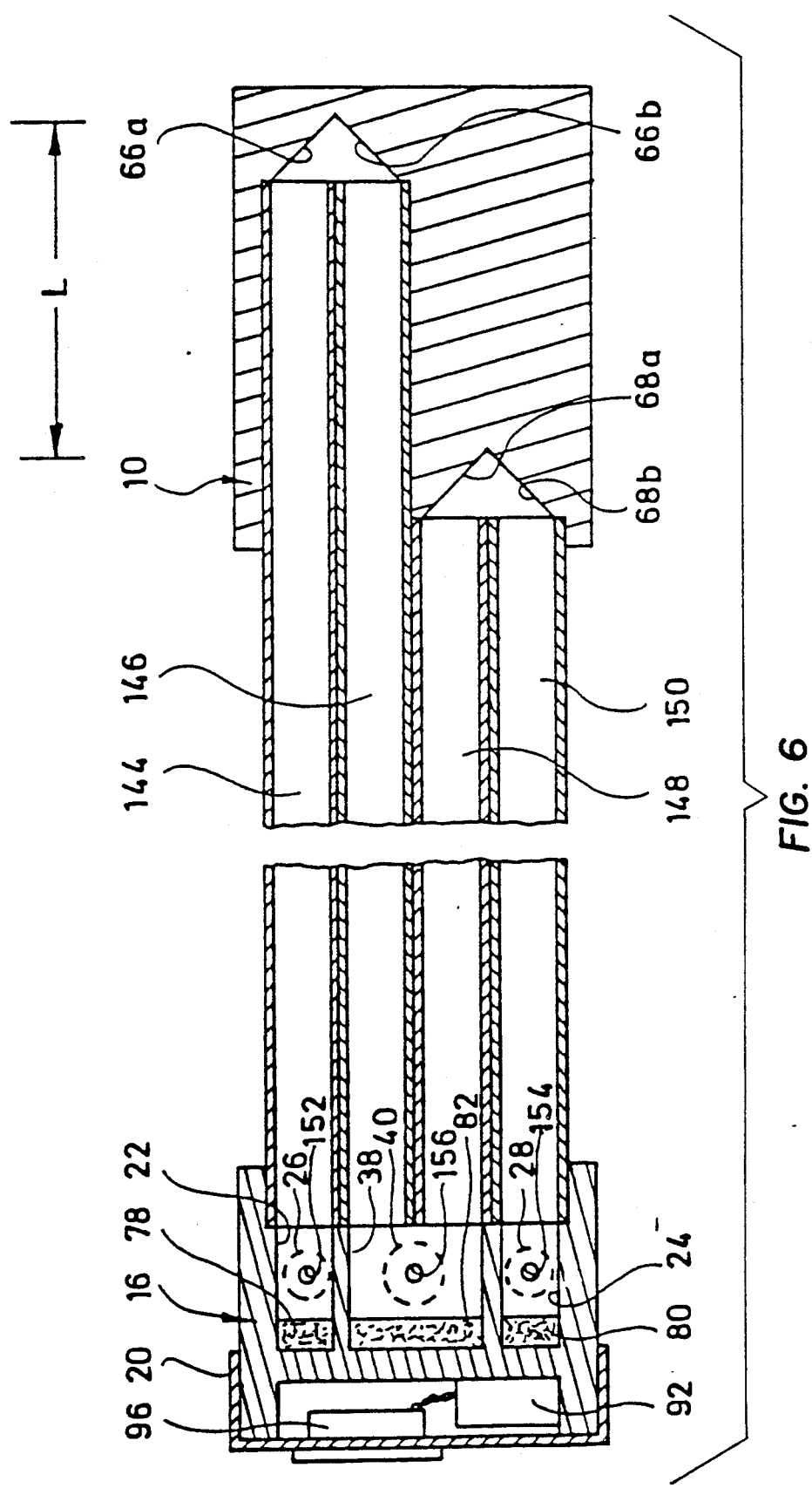
FIG. 6 is a longitudinal section through another precision gas thermometer with a sound conductor system composed of tubes.

The various walls of the sound conductor system which carry the sound on two different paths from the sound generator to sound receivers are provided in the gas thermometer of FIG. 6 by four tube sections 144, 146, 148 and 150. The tube sections 144 and 146 provide the measuring path which extends by the amount L deeper into the case end section 10 which is at the temperature being measured than the tubes 148 and 150.

In practice, tubes 144 to 150 have a very small diameter (inside diameter 1 to 2 mm) in comparison with the sound wavelength, so that there is a unimodal sound propagation within these tubes. The four tube sections have furthermore precisely the same cross section, so that the sound in them encounters precisely the same dispersion and damping conditions.

Another difference between the gas thermometer in FIG. 6 from the gas thermometer of FIG. 1 is that the insulators 78, 80, 82 completely cover the bottom surfaces of the recesses in the end plate 16 which face the ends of the tubes 144 to 150. Openings 152, 154 and 156 open from the side into the chambers in end plate 16 which are situated in back of the ends of the tube sections. The microphones 26, 28 are coupled acoustically through openings 152 and 154 to the ends of the tube sections 144 and 150. These microphones thus act as pressure detectors which are connected to sound conductors terminating in a sink. In like manner, the sound generator 40 is coupled as a generator of pressure variations to the ends of the tube sections 146 and 148 also terminating in an acoustical well.

In principle, the gas thermometer of FIG. 6 operates like the one shown in FIG. 1; but since the four small tube sections 144 to 150 having identical cross section are used to carry the sound on the measuring path and the reference path, and the free ends of these tube sections are terminated by an acoustical well, the isolation of the measuring path from the reference path is very good and interfering sound waves are outstandingly suppressed. Also interfering waves which are produced by any remaining discontinuities in the sound conductor system are very effectively attenuated, since these interfering waves are damped more greatly by a factor of 100 than the main wave. Since the tube sections 144 to 150 have only a small diameter, the gas thermometer is small in the transverse direction.

Figure 7:
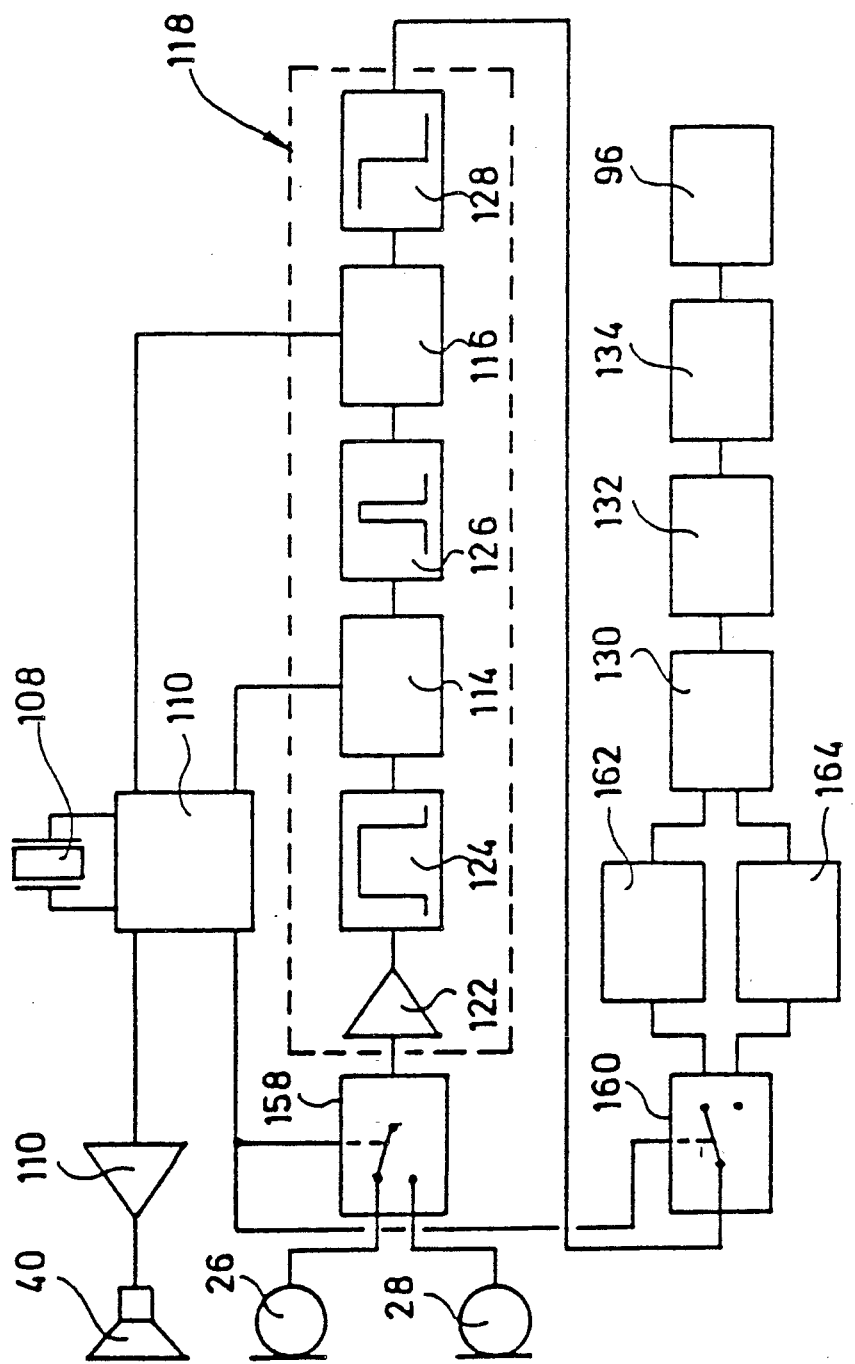
FIG. 7 is a block circuit diagram similar to FIG. 3 of a working and analyzing circuit of the gas thermometer of FIG. 6.

As it can be seen in FIG. 7, a modified working and operating circuit is also used in the gas thermometer of FIG. 6 and has only a single signal processing channel. By means of an electronic switch 158 operated by a low-frequency output of the frequency divider 110, the output signal of microphone 26 and microphone 28 is alternately connected to the input of the preamplifier 122. By the same output signal of the frequency divider 110, an additional electronic switch 160 is also controlled, by which the output signal of the low-pass filter 128 is alternately connected to a first signal memory 162 and to a second signal memory 164. The frequency with which the switches 158 and 160 are typically operated in practice can amount to about 2 Hz. The analysis of the signals stored in signal memories 162 and 164, which are associated with the transit time difference in the measuring path and reference path, is again performed as in the circuit shown in FIG. 3.

Inasmuch as only one signal forming circuit 118 is used for the signal processing, phasing errors of the signal forming circuit are automatically compensated. This makes it possible to make the signal forming circuit 118 from low-cost standard components. Precise tuning operations on the electronics do not have to be performed.

Figure 8:
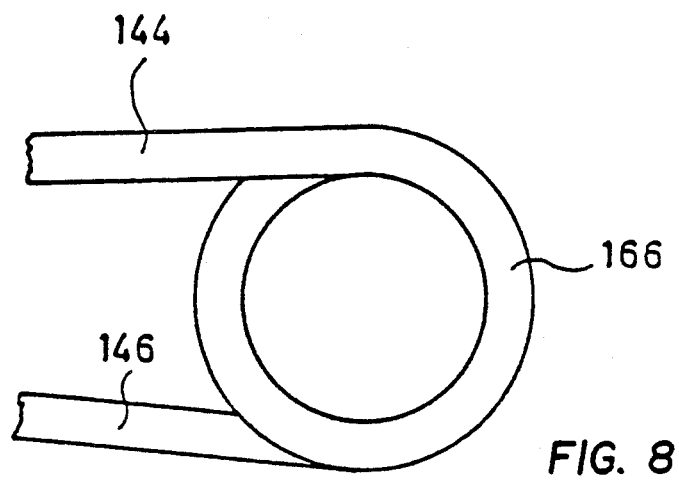
FIG. 8 is a fragmentary view of the end section at the point of measurement of a measuring sound conductor for alternative use in a gas thermometer similar to the one shown in FIG. 6.
Figure 9:
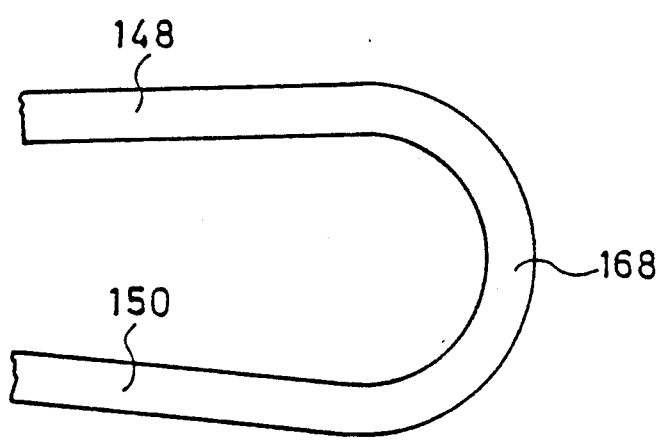
FIG. 9 shows the point-of-measurement end section of a reference sound conductor belonging to the measuring sound conductor of FIG. 8.
Figure 10:
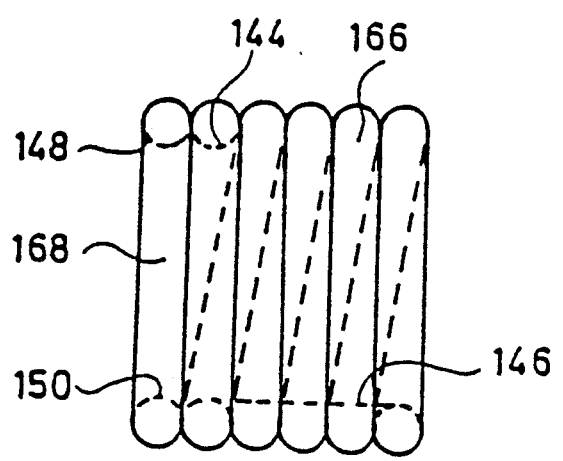
FIG. 10 is an elevation of the front of a sound conductor system which is obtained by -assembling together the sound conductors shown in FIGS. 8 and 9.

FIGS. 8 to 10 show a sound conductor arrangement which can be connected instead of the tube sections 144 to 150 to the end plate 16 in accordance with FIG. 6 (with slight modifications to the latter which will be described later).

The tube sections 144 and 146 are sections of a continuous tube, and the measuring-point ends of these tube sections are joined together by a coil 166. Thus the entire sound conductor shown in FIG. 8 can be made by the appropriate bending of tube material.

According to FIG. 9 the measuring-point ends of the tube sections 148 and 150 are joined together by an arcuate tube section 168. The sound conductor shown in FIG. 9 can also therefore be made simply by bending tube material.

Except for the end sections shown in FIGS. 8 and 9, the sound conductors for the measuring path (FIG. 8) and for the reference path (FIG. 9) can have the same dimensions. The two sound conductors are combined into one unit as in FIG. 10, and the outside return portion of the sound conductor can tilt down slightly toward the end plate 16, in a direction perpendicular to the coil axis so that both ends of the sound conductor will lie in the same plane.

To connect the sound conductor unit shown in FIG. 10 to the end plate 16 of FIG. 6, only the plate chambers lying in back of the open ends of the sound conductor unit have to be placed somewhat differently: the generator chamber then lies, for example, behind the upper ends, in FIG. 10, of the sound conductor unit (ends of the tube sections 144 and 148), while the two receiving chambers lie in back of the lower ends, in FIG. 10, of the sound conductor unit (ends of the tube sections 146 and 150).

It can be seen that, in this manner, it is possible to achieve a great difference in the path of the sound waves between the measuring path and the reference path, together with compact overall dimensions of the sound conductor system.

Figure 11:
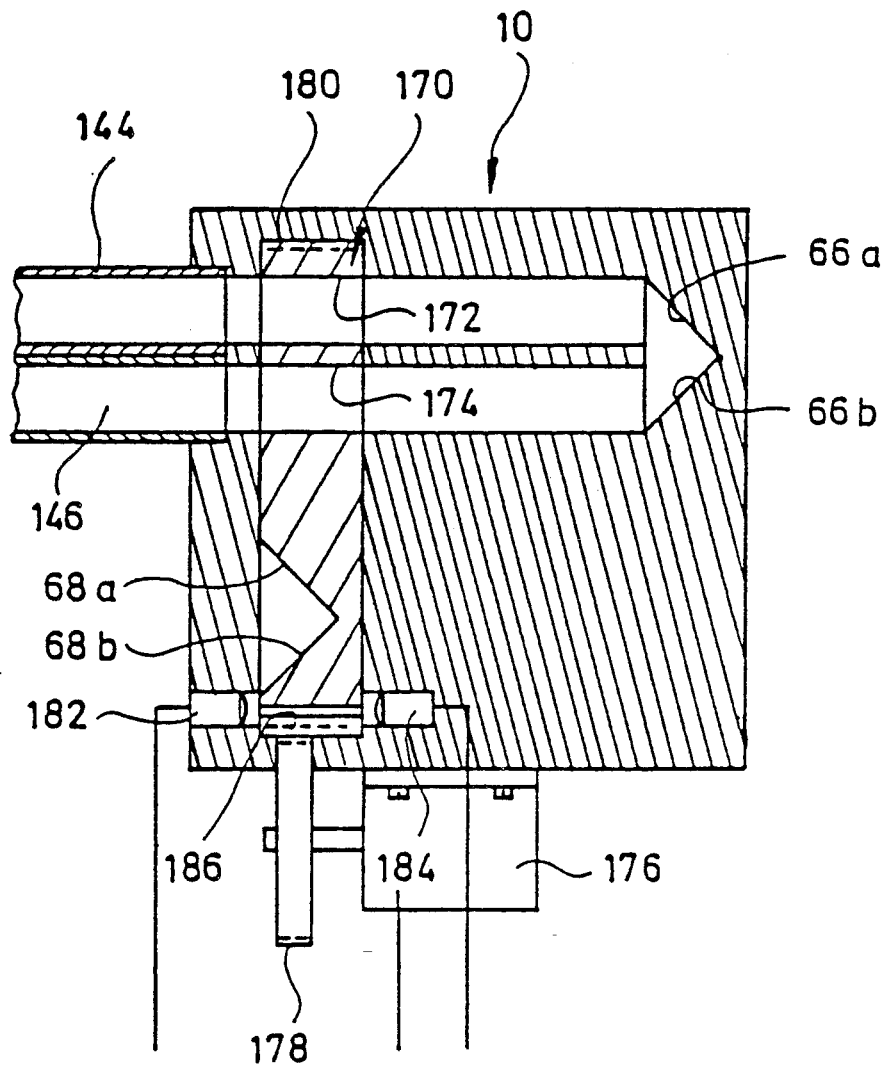
FIG. 11 is an axial section through the point-of-measurement end section of a further modified gas thermometer.

FIG. 11 shows the measuring-point end section of a gas thermometer which otherwise is the same as the upper half, in FIG. 6, of the gas thermometer there illustrated. In the gas thermometer according to FIG. 11, however, a reference path shorter than the measuring path is obtained by providing the reflector wall parts 68a and 68b in a control disk 170 which is mounted rotatably in the interior of the case end section 10. At a point diametrically opposite the reflector wall parts 68a and 68b the control disk 170 has two passages 172, 174, which, when the control disk is in the position shown in FIG. 11, form a flush continuation of the inside surface of the tube sections 144, 146, and thus open a sound path to the reflector wall parts 66a and 66b.

For the rapid, intermittent rotation of the control disk 170 between the measuring position shown in FIG. 11 and a reference position in which the reflector wall parts 68a and 68b are opposite the ends of the tube sections 144, 146, an electric motor 176 is provided whose shaft bears a pinion 178 which meshes with external gear teeth 180 of the control disk 170. The turning of the control disk 170 back and forth between its two working positions can take place typically at intervals of about 1 second. The reaching of the two working positions is detected by a photoelectric detector which consists of a light source 182 and a light detector 184 and cooperates with an index bore 186 in the control disk 170. The output signal of the index bore 186 can at the same time also produce the operation of the switches 158 and 160 of the working and analyzing circuit. The low-frequency output of the frequency divider 110 is then used in this embodiment to operate the electric motor 176 for a rapid rotation of the control disk 170 by 180° each time.

It is understood that, instead of a rotatable control disk, a linear-moving control slide can also be used.

Figure 12:
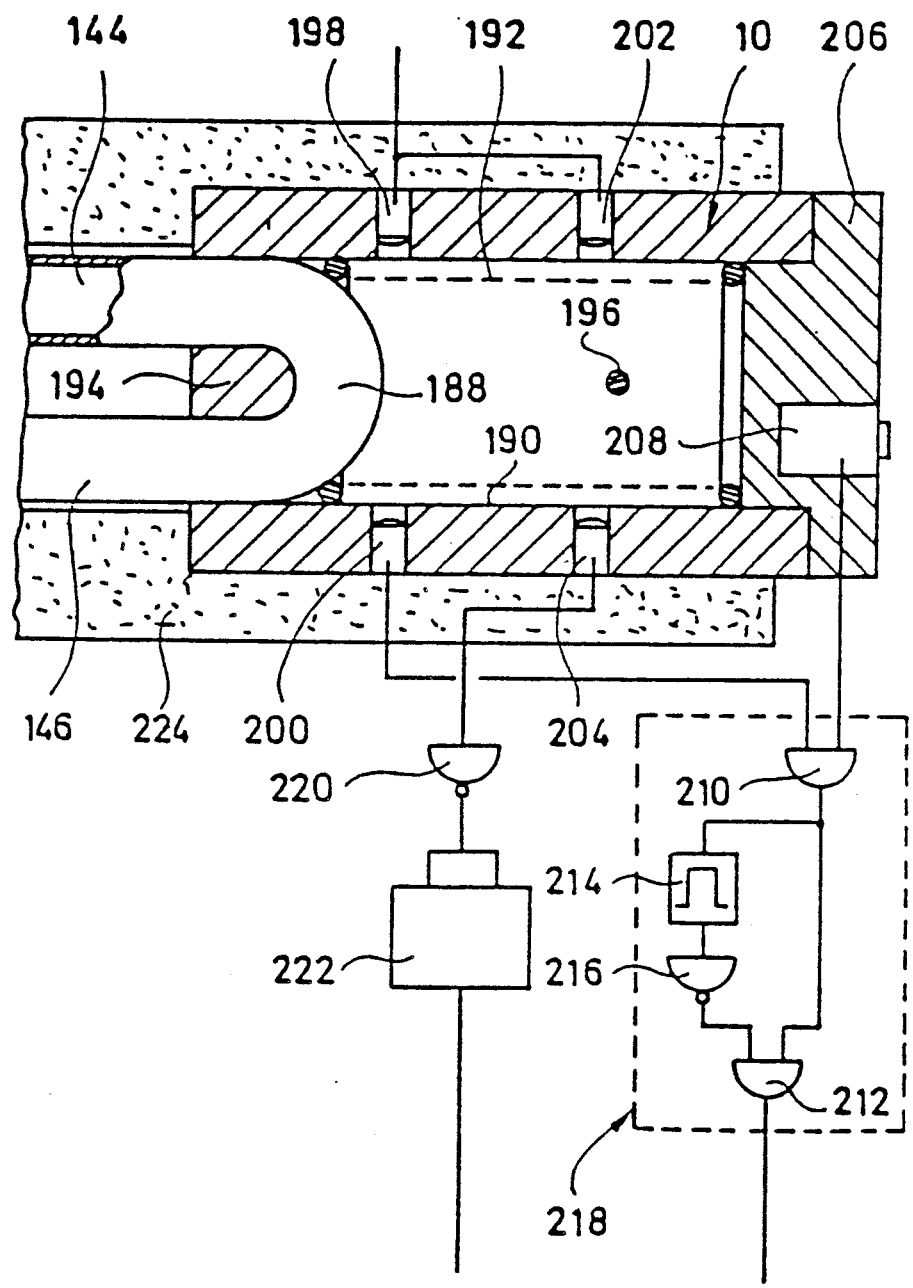
FIG. 12 is an axial section through the point-of-measurement end section of another gas thermometer in conjunction with circuits by which signal memories of the corresponding operating and analyzing circuit are controlled.

In the gas thermometer shown in FIG. 12, the difference between the heated measuring path and the reference path is determined by inserting a U-shaped sound conductor into the case end section 10 to a given distance (L) from the margin of the area in the case end section 10 that is at the measuring temperature. The sound conductor consists of the above-discussed tube sections 144, 146, and of an arcuate tube section joining their ends. The entire sound conductor can thus again be made by bending tube material. The sound conductor is axially displaceable in a cavity 190 in the case end section 10 and biased in the outward direction by a coil spring 192. The outward movement of the sound conductor is limited by a transverse portion 194 which thus determines a rearward or reference position of the sound conductor. If the sound conductor is shifted rightwardly against the force of the coil spring 192 in FIG. 12, it comes to a stop against a stop pin 196 which defines a forward or measuring position.

A first photoelectric detector consisting of a light source 198 and a light detector 200 is activated when the sound conductor moves to the rearward working position shown in FIG. 12. A second photoelectric detector with a light source 202 and a light detector 204 will be interrupted just when the sound conductor reaches the working position situated on the right in FIG. 12, in which it encounters the stop pin 196. The output signals of the light detectors 200 and 204 can thus be used for the automatic operation of the switch controller signal memories, as shown at 160 in FIG. 7.

To assure that a reference signal associated with the rearward working position of the sound conductor will be accepted in the electronics only if the case end section 10 is on the body to be tested, a microswitch 208 is integrated into a cap 206 on the case end section 10. Its output signal is combined with the output signal of the light detector 200 by an AND gate 210. The output signal of the AND gate 210 is combined by an additional AND gate 212 with the output signal of the AND gate 210 which is delayed by a monostable multivibrator 214 and an inverter 216, so that a signal is obtained at the output of this discriminator circuit generally identified by 218 only when the gas thermometer is tightly in contact with the object to be tested and the sound conductor was in its rearward working position for a given minimum time. The output signal of the discriminator circuit 218 then serves for the operation of a reference signal memory of the working and analyzing circuit.

The output signal of the light detector 204 is delivered through an inverter 220 to an additional discriminator circuit 222 whose internal construction is the same as that of the discriminator circuit 218.

By placing the gas thermometer with the face of the cap 206 tightly against the object to be measured, but using less contact force than the bias force of the coil spring 192, it is possible to obtain the reference signal. When the force of the coil spring 192 is overcome and the sound conductor is pressed for a given period of time against the stop pin 196, a measurement signal value is received in a memory of the working and analyzing circuit which corresponds exactly to the phase shift of the sound upon passing twice through the path L at the temperature to be measured.

The gas thermometer of FIG. 12 is characterized by an especially simple construction; furthermore there are no moving parts which have to be sealed gas-tight against stationary parts.

The case end section 10 and preferably also the legs of the sound conductor are surrounded by an insulation 224.

In the embodiments described above, sound conductor systems have been considered which were made from metallic material. Alternatively the defining walls of the sound conductor system can also be made wholly or only partially of ceramic.

We claim:
1. Gas thermometer having
   a sound generator (40) producing a sound field,
   a first reflector wall (66b, 66a) disposed at a first distance from the sound generator,
   a second reflector wall (68a, 68b) disposed at a second, different, distance from the sound generator,
   a first sound receiver (26) which receives sound reflected by the first reflector wall,
   a second sound receiver (28) which receives sound reflected by the second reflector wall, and
   a phase difference measuring circuit (92) which receives output signals generated by the sound receivers (26,28) and generates a working signal associated with a phase difference between said output signals of said receivers,
   wherein
   said first and second reflector walls (66, 68), together with additional walls (50 to 60) of a sound conductor system, form a hermetically sealed case (10, 14, 16) in which a working gas is enclosed, and which case defines sound channels for sound outgoing from said generator (40) and reflected sounds directed toward respective ones of said receivers (26,28); and
   each reflector wall (66, 68) has two wall parts (66a, 66b and 68a, 68b, respectively) an angle of 90° to each other and each of said wall parts is at an angle of 45' to a longitudinal axis of said sound channels between the sound generator (40) and said walls (66, 68).

2. Gas thermometer according to claim 1, wherein said working gas is a noble gas selected from the group consisting of kryton, xenon, and helium.

3. Gas thermometer according to claim 1, characterized in that the hermetically sealed case (20, 14, 16) is connected with a rigid equalization tank (140) whose volume is great compared with the volume of the case part which is brought to the measuring temperature when the measurement is made.

4. Gas thermometer according to claim 1, characterized in that the hermetically sealed case (10, 14, 16) is connected with an elastic equalization tank (142).

5. Gas thermometer according to claim 1, characterized in that the sound generator (40) is coupled through a small lateral wall opening (156) in the hermetically sealed case to the first ends of the sound channels (144 to 150).

6. Gas thermometer according to claim 1, characterized in that the sound receivers (26, 28) are coupled through small lateral wall openings (152, 154) in the case to second ends of the sound channels defined by the case.

7. Gas thermometer according to claim 5, characterized in that sound absorbers (78 to 82) are disposed behind the first ends and the second ends, respectively, of the sound channels (144 to 150).

8. Gas thermometer according to claim 1, characterized in that two folded sound channels are formed by four tubing sections (144 to 150) having a small diameter compared to the sound wavelength.

9. Gas thermometer according to claim 8, characterized in that the tube sections (144 to 150) all have equal diameters.

10. Gas thermometer according to claim 9, characterized in that the measuring-point ends of the tube sections (144 to 150) are joined together by curved tube sections (166, 168).

11. Gas thermometer according to claim 10, characterized in that one of the curved tube sections is configured as a coiled tube (166).

12. Gas thermometer according to claim 1, characterized in that the sound generator (40) and the sound receivers (26, 28) are built sealingly (30, 32, 42) into a wall (16) of the hermetically sealed case.

13. Gas thermometer according to claim 1, characterized in that the sound generator and the sound receivers are disposed on the interior of the hermetically sealed case and are connected by gas-tight lead-throughs to an associated working and analyzing circuit.

14. Gas thermometer according to claim 1, characterized in that the sound generator and the sound receivers are disposed on the interior of the hermetically sealed case and the working and analyzing circuit associated with them is likewise disposed on the interior of the case and is connected by a gas-tight lead-through to an external display.

15. Gas thermometer according to claim 1, characterized by dividing walls (46, 48, 62, 64) which align each with an apex of the angled reflector walls (66, 68) and terminate at a distance in front of this apex.

16. Gas thermometer according to claim 1, characterized in that in back of the reflector wall (68) that is disposed at the shorter distance from the sound generator (40) a secondary wall (72) is provided which corresponds thermoconductively to the portion of the case lying behind this reflector wall, as seen in the lengthwise direction of the case, which [portion]in turn includes the other reflector wall (66), [and]is preferably similar in geometrical configuration to this case part.

17. Gas thermometer according to claim 16, characterized in that the secondary wall includes secondary reflector walls (102, 104) by which the sound path behind the reflector wall (68) disposed at the shorter distance from the sound generator (40) is folded meanderwise.

18. Gas thermometer according to claim 1, characterized in that the angled reflector wall (66) and the secondary reflector walls (102, 104) if any, disposed at the greater distance from the sound generator (40) are joined at their apexes to a contact plate (76) of good thermal conductivity.

19. Gas thermometer according to claim 1, characterized in that the section of the hermetically sealed case lying between the reflector walls is made from material of good thermal conductivity.

20. Gas thermometer according to claim 1, characterized in that the two sound receivers (26, 28) are connectable through a switch (158) to a common signal forming circuit (118) which is connected through a second equally controlled switch (160) to two memories (162, 164) or two different transit time circuits selected in consideration of the switching time.

* * * * *